United States Patent
Heyerman et al.

(10) Patent No.: US 10,228,304 B2
(45) Date of Patent: Mar. 12, 2019

(54) SHAFT SHEAR DETECTION THROUGH SHAFT OSCILLATION

(71) Applicant: PRATT & WHITNEY CANADA CORP., Longueuil (CA)

(72) Inventors: Jeffrey Bernard Heyerman, Oakville (CA); Antwan Shenouda, Mississauga (CA); Michael Krynski, Waterdown (CA); Poi Loon Tang, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 358 days.

(21) Appl. No.: 14/997,913

(22) Filed: Jan. 18, 2016

(65) Prior Publication Data

US 2017/0205312 A1    Jul. 20, 2017

(51) Int. Cl.

| | |
|---|---|
| *G01M 13/02* | (2006.01) |
| *G01M 15/14* | (2006.01) |
| *F01D 21/06* | (2006.01) |
| *F01D 21/04* | (2006.01) |
| *F02C 3/04* | (2006.01) |
| *G01M 13/028* | (2019.01) |
| *G01L 5/00* | (2006.01) |

(52) U.S. Cl.
CPC .......... *G01M 13/028* (2013.01); *F01D 21/06* (2013.01); *G01L 5/00* (2013.01); *G01M 15/14* (2013.01); *F01D 21/04* (2013.01); *F02C 3/04* (2013.01); *F05D 2270/091* (2013.01); *F05D 2270/80* (2013.01)

(58) Field of Classification Search
CPC .......... G01H 1/006; G01P 3/48; G01P 3/481; G01M 13/028; G01M 15/14; F01D 21/06; F01D 21/04; F01D 21/045; F05D 2270/80; F05D 2270/091; F02C 3/04
See application file for complete search history.

(56) References Cited

U.S. PATENT DOCUMENTS

| | | | |
|---|---|---|---|
| 4,833,405 A | 5/1989 | Richards et al. | |
| 5,293,774 A | 3/1994 | Ratherham | |

(Continued)

FOREIGN PATENT DOCUMENTS

| | | |
|---|---|---|
| FR | 2921974 | 4/2009 |
| GB | 2488805 | 12/2012 |
| JP | 2007-108189 | 4/2007 |

OTHER PUBLICATIONS

European Search Report, dated May 18, 2017, 7 pages, EP Application No. 17152036.4.

*Primary Examiner* — Jill E Culler
*Assistant Examiner* — Leo T Hinze
(74) *Attorney, Agent, or Firm* — Norton Rose Fulbright Canada LLP

(57) ABSTRACT

There is described a shaft shear event detection method. The method comprises storing in memory a shaft oscillation signature determined as a function of known characteristics of the shaft and associated with a shaft shear event; monitoring a rotational speed of the shaft; detecting from the rotational speed an oscillation wave superimposed on the rotational speed, the oscillation wave having a wave modulation frequency and a wave modulation amplitude; comparing the oscillation signature to the oscillation wave; and detecting the shaft shear event when the oscillation wave corresponds to the oscillation signature.

19 Claims, 7 Drawing Sheets

(56) References Cited

U.S. PATENT DOCUMENTS

| | | | | |
|---|---|---|---|---|
| 6,445,995 B1* | 9/2002 | Mollmann | ............. | G01H 1/006 |
| | | | | 235/103 |
| 6,494,046 B1 | 12/2002 | Hayess | | |
| 7,328,621 B2* | 2/2008 | Kurt-Elli | ................ | G01H 1/006 |
| | | | | 702/198 |
| 7,743,658 B2 | 6/2010 | Filbry | | |
| 7,860,665 B2* | 12/2010 | Parrish | .................... | G01L 3/109 |
| | | | | 702/41 |
| 8,943,876 B2 | 2/2015 | Rowe et al. | | |
| 9,506,401 B2 | 11/2016 | Bacic et al. | | |
| 2012/0107094 A1 | 5/2012 | Lillis | | |
| 2012/0303330 A1* | 11/2012 | Bourget | ................ | F01D 21/003 |
| | | | | 702/190 |
| 2013/0312423 A1* | 11/2013 | Bacic | ................... | F01D 21/003 |
| | | | | 60/779 |
| 2013/0319092 A1* | 12/2013 | Rowe | .................... | F01D 21/003 |
| | | | | 73/112.01 |
| 2014/0121934 A1 | 5/2014 | Dooley | | |
| 2016/0178464 A1 | 6/2016 | Burns et al. | | |
| 2016/0194977 A1 | 7/2016 | Macdonald | | |
| 2018/0010980 A1* | 1/2018 | Shenouda | ............ | G01M 13/028 |

* cited by examiner

SHAFT SHEAR DETECTION THROUGH SHAFT OSCILLATION

TECHNICAL FIELD

The application relates generally to detecting shaft shears and, more particularly, to detecting shaft shears of loaded, rotating shafts, positioned between a source and a load.

BACKGROUND OF THE ART

The low pressure shaft on a gas turbine engine connects the lower pressure turbine to the fan, and transfers the power from the turbine to the fan. The transferred power is then converted into engine thrust. During engine operation, the shaft experiences very high torsional loads. In the unlikely event of a shaft shear and loss of load, the fuel must be shut off quickly to prevent damage to the engine.

Several methods exist for detecting shaft shear. For example, mechanical axial detection involves using a probe or sensor adjacent to a rear end of the shaft to detect the axial motion of the shaft after the shear. The sheared shaft collides with the sensor, resulting in a fuel shutoff. Another example comprises using a processor to calculate a rate of change of shaft speed. When the rate of change falls below a certain value for a period of time, a fuel shutoff is commanded.

Methods that involve delayed indicators, such as axial displacement and axial movement, or time-consuming signal processing, such as rate of change of shaft speed, are not well-suited for a process requiring rapid fuel shutoff. In addition, methods that require special sensors or additional hardware also have certain disadvantages, such as additional cost and weight, and/or give rise to durability and reliability concerns.

There is therefore a need to improve on existing methods for detecting shaft shear.

SUMMARY

In one aspect, there is provided method for detecting a shear of a rotating shaft positioned between a source and a load. The method comprises storing in memory a shaft oscillation signature determined as a function of known characteristics of the shaft and associated with a shaft shear event; monitoring a rotational speed of the shaft; detecting from the rotational speed an oscillation wave superimposed on the rotational speed, the oscillation wave having a wave modulation frequency and a wave modulation amplitude; comparing the oscillation signature to the oscillation wave; and detecting the shaft shear event when the oscillation wave corresponds to the oscillation signature.

In another aspect, there is provided system for detecting a shear of a rotating shaft positioned between a source and a load. The system comprises a memory storing a shaft oscillation signature determined as a function of known characteristics of the shaft and associated with a shaft shear event; and at least one of at least one processor configured for executing program code and a circuit. The at least one of (a) and (b) is configured for monitoring a rotational speed of the shaft; detecting from the rotational speed an oscillation wave superimposed on the rotational speed, the oscillation wave having a wave modulation frequency and a wave modulation amplitude; comparing the oscillation signature to the oscillation wave; and detecting the shaft shear event when the oscillation wave corresponds to the oscillation signature.

In a further aspect, there is provided a system for detecting a shear of a rotating shaft positioned between a source and a load. The system comprises means for storing in memory a shaft oscillation signature determined as a function of known characteristics of the shaft and associated with a shaft shear event; means for monitoring a rotational speed of the shaft; means for detecting from the rotational speed an oscillation wave superimposed on the rotational speed, the oscillation wave having a wave modulation frequency and a wave modulation amplitude; means for comparing the oscillation signature to the oscillation wave; and means for detecting the shaft shear event when the oscillation wave corresponds to the oscillation signature.

DESCRIPTION OF THE DRAWINGS

Reference is now made to the accompanying figures in which.

DETAILED DESCRIPTION

Figure 1:
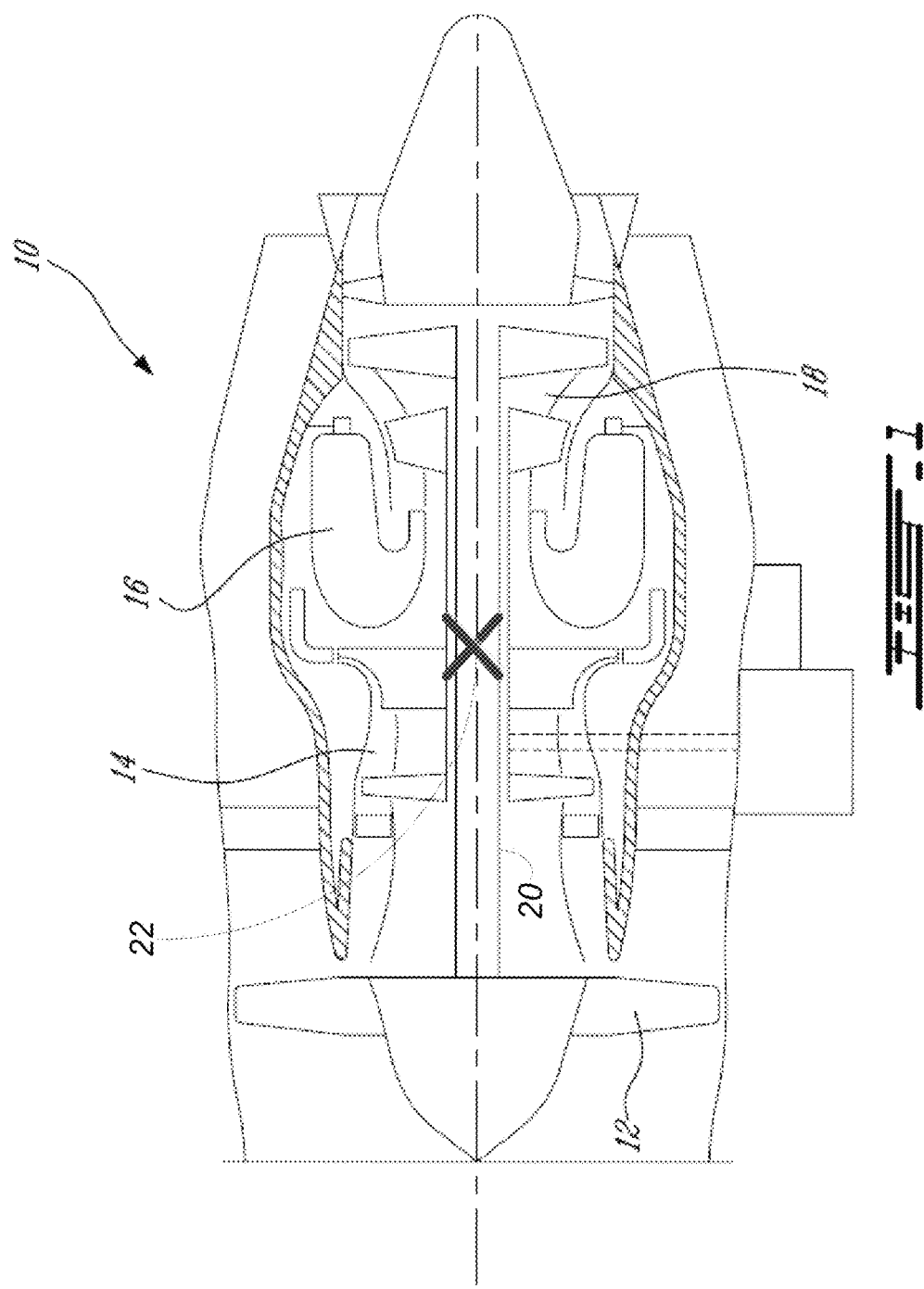
FIG. 1 is a schematic cross-sectional view of a gas turbine engine.

FIG. 1 illustrates a gas turbine engine 10 of a type that may be provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A shaft 20 is provided between the turbine 18, and the fan 12. A shaft shear 22 may occur at any point along the shaft 20. When the shaft 20 shears, the sudden unloading results in a rapid untwisting of the shaft 20. The untwisting causes a unique oscillation or ringing of the shaft 20. This ringing may be identified as a unique oscillation signature for detecting the shaft shear 22 and triggering a fuel shutoff command. Note that while the turbine engine 10 illustrated in FIG. 1 is a turbofan engine, the detection methods and systems described herein may also be applicable to turboprop engines and turboshaft engines. In addition, the teachings herein are not limited to turbine engines as a shear of any rotating loaded shaft provided between a source (such as a turbine) and a load (such as a fan) may be detected using the unique oscillation signature that results from a shaft shear event.

Figure 2:
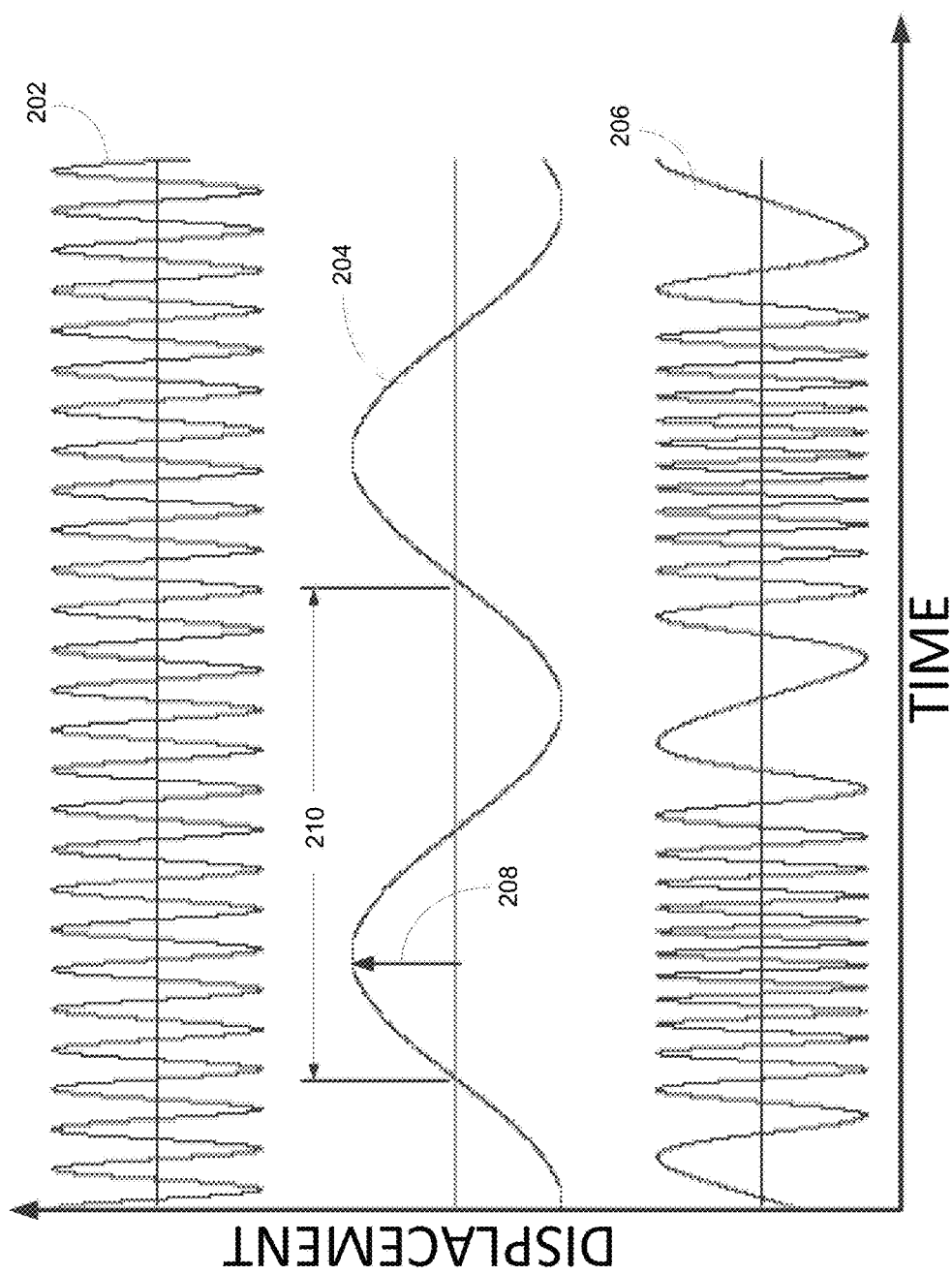
FIG. 2 is an illustration of a frequency modulation signal composition.

The shaft shear 22 manifests itself as an oscillation wave that is superimposed on the shaft speed signal and may be used as a signature indicative of a shear for a given shaft. The superimposed oscillation wave will be referred to herein as a shaft oscillation signature. The waveform that results from the oscillation wave being superimposed on the shaft speed signal, referred to herein as a resultant modulated waveform, is composed of a carrier wave and a modulating wave. The carrier wave represents the speed of the shaft before the shear, and the modulating wave represents the oscillation wave due to the sudden unloading of the shaft 20, and thus the shaft oscillation signature. Referring to FIG. 2, there is illustrated an example of a carrier wave 202, a modulating wave 204, and a resultant modulated waveform 206 obtained from the combination of the carrier wave 202 and the modulating wave 204. All three waves 202, 204, 206 are plotted as displacement (y axis) versus time (x axis). The carrier wave 202 is the speed of the shaft 20 before the shaft shear event. The modulating wave 204 is the oscillation of the shaft 20 immediately after the shaft shear event. It is this oscillation that is detected as a shaft oscillation signature from the resultant modulated waveform 206 in order to detect a shaft shear event.

The level of deviation of the modulation wave 204 from the carrier wave 202 is a function of the torque experienced by the shaft 20 immediately before the shear and corresponds to the amplitude of the modulation wave 204, referred to herein as a wave modulation amplitude 208. The frequency of the modulation wave 204, referred to herein as a wave modulation frequency, corresponds to the reciprocal of the period 210. The wave modulation frequency is independent of the torque on the shaft 20 and is a function of the physical location of the shear on the shaft as well as the dynamics and physical characteristics of the rotating system. Therefore, the unique shaft oscillation signature that results from a shaft shear event may be composed of a range of possible wave modulation frequencies and wave modulation amplitudes, as a function of possible positions of shaft shear and possible torque levels applied to the shaft 20, respectively. The applicable ranges of wave modulation frequencies and wave modulation amplitudes may be determined beforehand using various modeling techniques, known to those skilled in the art. In some embodiments, the applicable wave modulation amplitudes may be determined, or narrowed from a broader range, during engine operation by measuring shaft torque or by monitoring other engine parameters from which torque may be calculated.

Figure 3:
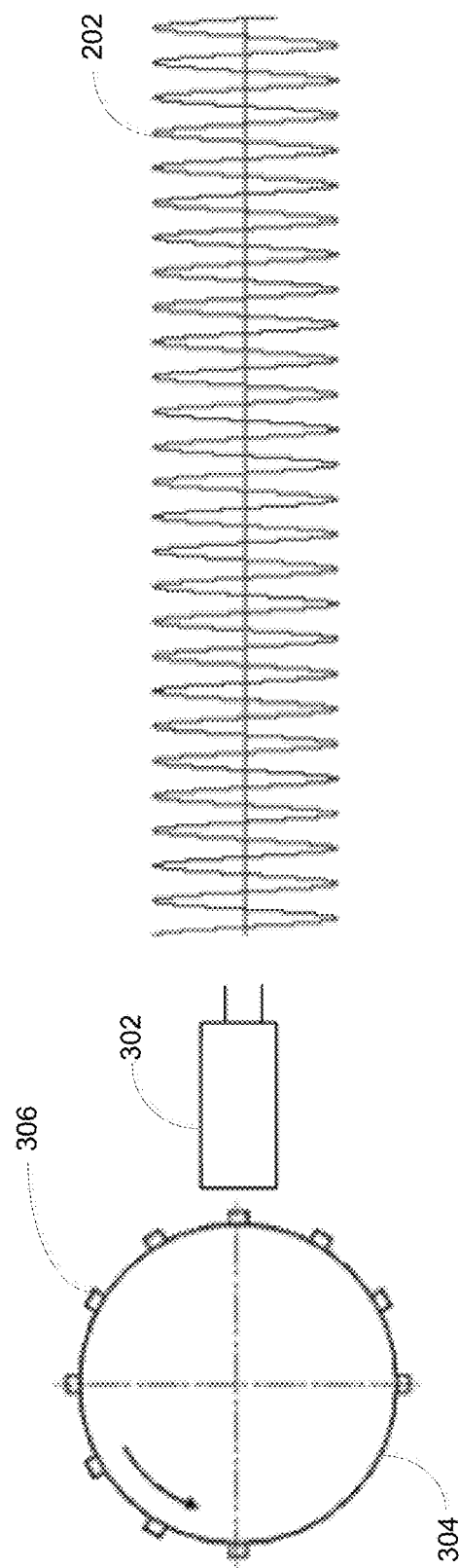
FIG. 3 is an example embodiment of a speed sensing device.

Some examples of physical characteristics affecting the dynamics of the rotating system include the shape of the shaft (including circumference and length), material properties of the shaft, damping characteristics of the rotor system, and the characteristics of the speed sensing device used to obtain the rotational speed of the shaft. Various speed sensing devices may be used to measure the rotational speed of the shaft. The speed sensing device should be selected such that the maximum possible oscillation frequency resulting from a shear may be detected while operating at the lowest possible shaft speed. The speed sensing device may be contact-based or non-contact based. In some embodiments, a contact-based device may be composed of a phonic wheel assembly, as illustrated in FIG. 3. A phonic wheel 304 having a plurality of teeth 306 distributed around an outer surface thereof may be placed in contact with the rotating shaft 20. A sensor 302 is positioned relative to the phonic wheel 304. The rotating shaft 20 propels the phonic wheel 304, creating pulses that are read by the sensor 302 and converted into revolutions per unit time. The sensor 302 may be a proximity sensor, an optical sensor, an inductive sensor, or any other type of sensor known to those skilled in the art. In some embodiments, the number of phonic wheel teeth 306 is selected such that the lowest speed signal frequency is at least five times the highest possible oscillation frequency resulting from the shear. In some embodiments, the number of phonic wheel teeth 306 is selected such that the lowest speed signal frequency is at least six times the highest possible oscillation frequency resulting from the shear. In some embodiments, the number of phonic wheel teeth 306 is selected such that the lowest speed signal frequency is at least seven times the highest possible oscillation frequency resulting from the shear. In some embodiments, the number of phonic wheel teeth 306 is selected such that the lowest speed signal frequency is at least eight times the highest possible oscillation frequency resulting from the shear. Other embodiments for the number of teeth 306 of the phonic wheel may also be used in order to ensure that the phonic wheel 304 have enough teeth 306 to sample the highest possible oscillation frequency at the lower possible speed.

In some embodiments, a non-contact device may be composed of a single electronic device, such as a Fast Synchronization Sensor (FSS), which comprises a magnetic dipole keyed to one end of the shaft by means of a non-magnetic holder, in front of which a magnetic encoder sensor is positioned. In other embodiments, a non-contact device comprises a light source, such as a laser or infrared light, that is aimed at the rotating shaft 20 to which one or more pieces of reflective tape have been affixed. As the light source hits the shaft 20, it is reflected off the tape and back to the sensor that converts the reflected light measurements into revolutions per unit time. Other embodiments for sensing the rotational speed of the shaft 20 may also be used.

Figure 4:
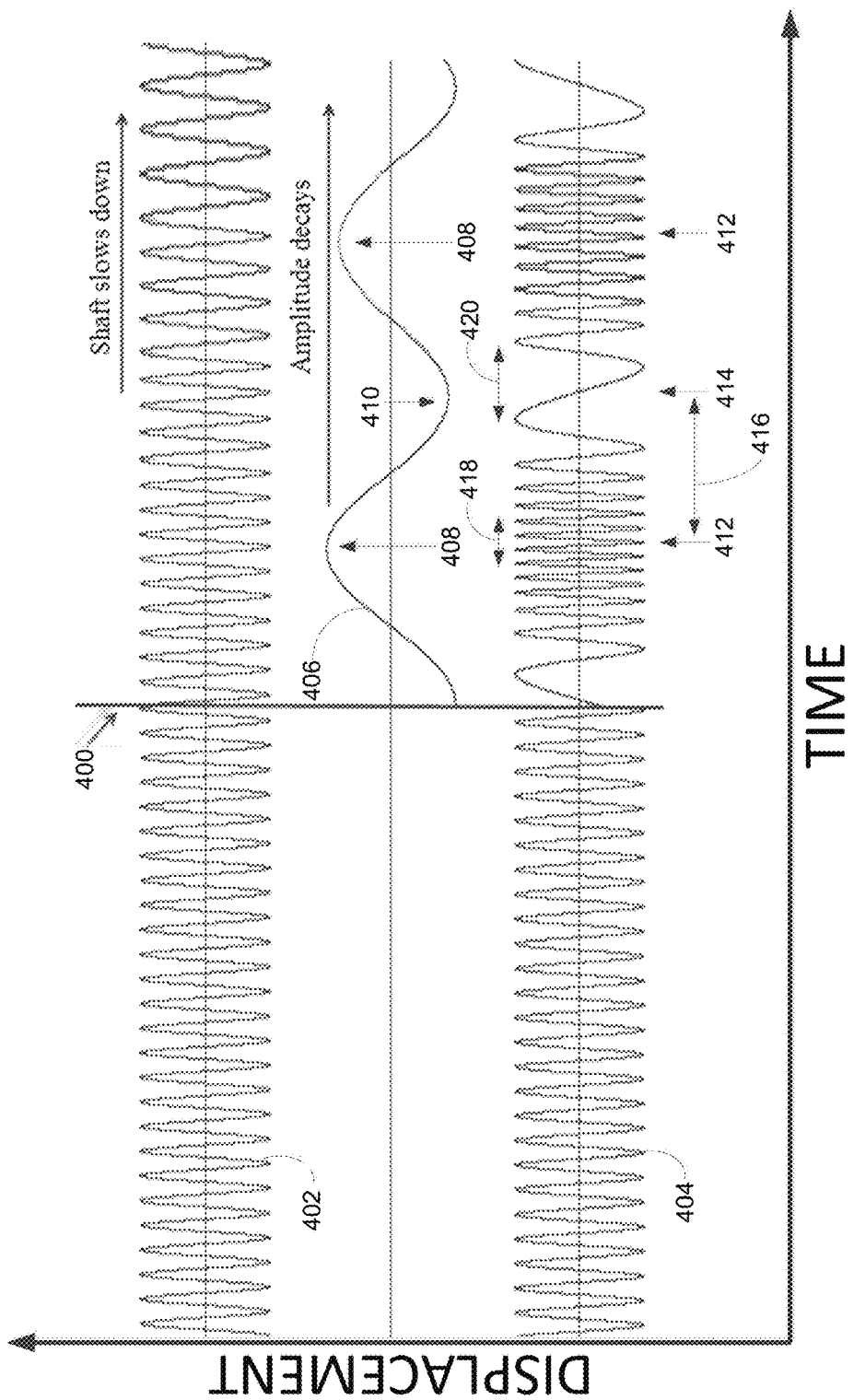
FIG. 4 is an example embodiment of a raw speed signal resulting from a shaft shear.

Turning now to FIG. 4, there is illustrated the carrier wave 402 (or shaft speed) and the resultant modulated waveform 404 before and after a shaft shear event 400. Before the shaft shear event 400, the carrier wave 402 is not modulated by any other waveform and therefore, is identical to the resultant modulated waveform 404. After the shaft shear event 400, an oscillation wave is superimposed on the shaft speed and can be seen as the modulation wave 406. The carrier wave 402 progressively slows as the shaft speed decreases. The resultant modulated waveform 404 is modified by the modulation wave 406. As illustrated, the modulation wave 406 will affect the period, and thus the frequency, of the resultant modulated waveform 404. The instances of highest frequency 412 of the resultant modulated waveform 404 will correspond to the amplitude peaks 408 of the modulating wave 406, while the instances of lowest frequency 414 of the resultant modulated waveform 404 will correspond to the amplitude valleys 410 of the modulating wave 406.

Figure 5:
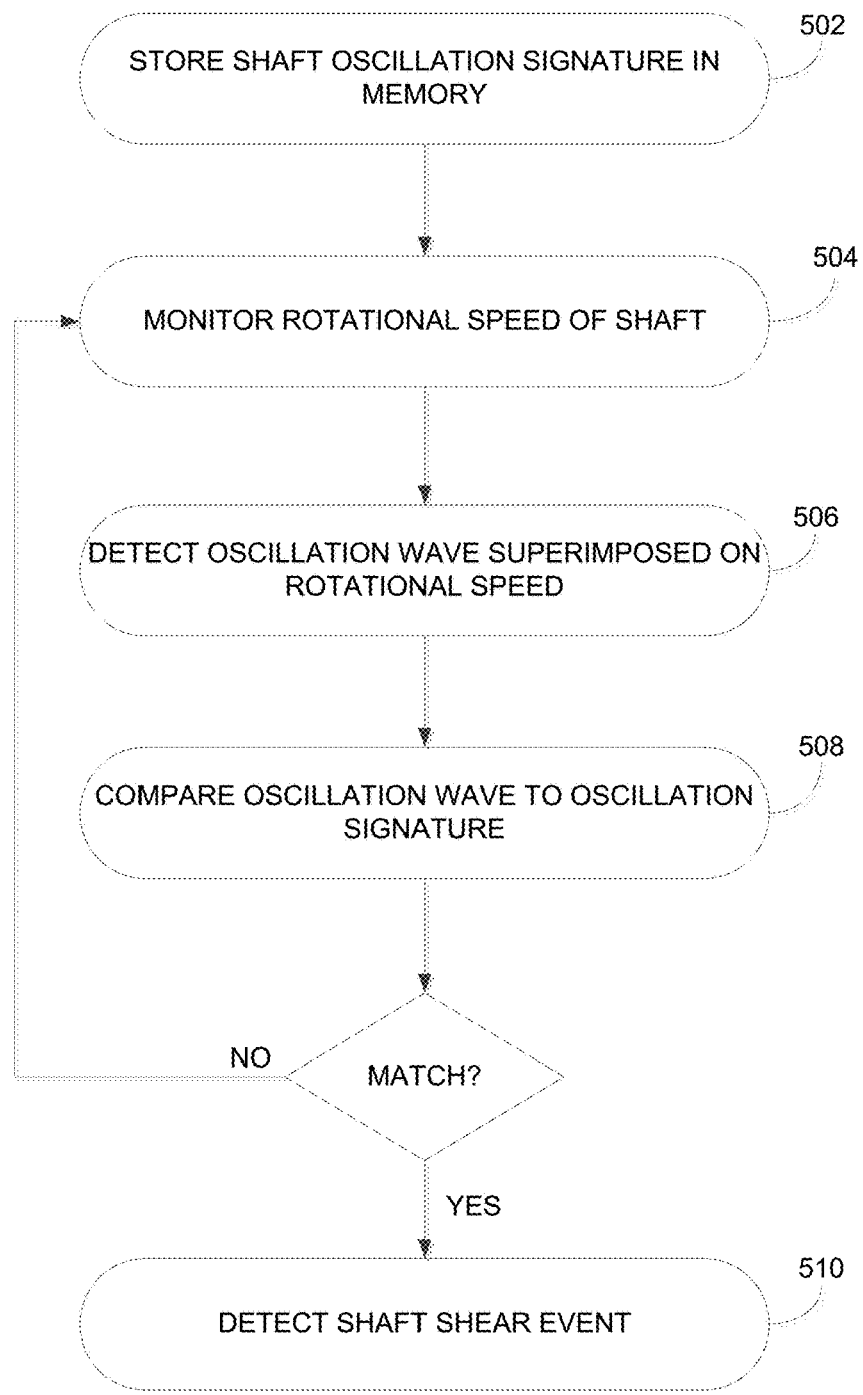
FIG. 5 is a flowchart of a shear shaft detection method, in accordance with an embodiment.

Referring to FIG. 5, there is illustrated an embodiment of a method for detecting a shear of a rotating shaft provided between a source and a load. At 502, one or more shaft oscillation signatures are stored in memory. There may be a single shaft oscillation signature stored, or a plurality of shaft oscillation signatures, each one of the plurality corresponding to a specific shaft. Each shaft oscillation signature may be composed of a single modulation frequency, referred to herein as a signature modulation frequency, and a single modulation amplitude, referred to herein as a signature modulation amplitude. Each shaft oscillation signature may alternatively comprise a range of signature modulation frequencies and/or signature modulation amplitudes. At 504, the rotational speed of the shaft is monitored. At 506, an oscillation wave superimposed on the rotational speed is detected. At 508, the oscillation wave and the shaft oscillation signature are compared. When a match is determined, a shaft shear event is detected, as per 510. If there is no match, the method continues to monitor the rotational speed of the shaft, as per 504.

In some embodiments, comparing the oscillation wave and the shaft oscillation signature, as per 508, comprises comparing a signature modulation frequency to a wave modulation frequency and comparing a signature modulation amplitude to a wave modulation amplitude. If the shaft oscillation signature comprises a range of signature modulation frequencies and/or a range of signature modulation amplitudes, then comparing the shaft oscillation wave to the shaft oscillation signature comprises determining if the wave modulation frequency and the wave modulation amplitude fall within the range of signature modulation frequencies and the range of signature modulation amplitudes, respectively.

In some embodiments, detecting from the rotational speed an oscillation wave, as per 506, comprises determining the wave modulation amplitude and the wave modulation frequency directly from the resultant modulated waveform. For example, this can be done by decomposing the resultant modulated waveform into a carrier wave and a modulation wave and extracting the amplitude and frequency from the modulation wave. The resultant modulated waveform may be represented as follows:

$$y(t) = A_c \cos\left(2\pi f_c t + \frac{f_\Delta}{f_m}\cos(2\pi f_m t)\right)$$

where $A_c$ is the carrier wave amplitude, $f_c$ is the carrier wave frequency, $\Delta f$ is the wave modulation amplitude, and $f_m$ is the wave modulation frequency.

In some embodiments, detecting from the rotational speed an oscillation wave, as per 506, comprises determining the wave modulation amplitude and wave modulation the frequency indirectly from the resultant modulated waveform. For example, the method may involve detecting when a period of the resultant modulated waveform reaches below a lower threshold and above an upper threshold. Referring back to FIG. 4, the carrier swing 416 is the total deviation of the waveform from a highest frequency 412 to a lowest frequency 414. The highest frequency 412 occurs when the period exceeds the upper threshold 418. The lowest frequency 414 occurs when the period falls below the lower threshold 420. The carrier swing corresponds to twice the wave modulation amplitude. The rate of occurrence of the period exceeding the upper threshold 418 and falling below the lower threshold 420 is representative of the wave modulation frequency.

The detection method described herein may be implemented in various manners, such as in software on a processor, on a programmable chip, or on an Application Specific Integrated Chip (ASIC), or as a hardware circuit. In some embodiments, the detection method is implemented in hardware on a dedicated circuit board located inside an Electronic Engine Controller (EEC) or an Engine Control Unit (ECU). The EEC or ECU may be provided as part of a Full Authority Digital Engine Control (FADEC) of an aircraft. In some cases, a processor may be used to communicate information to the circuit, such as shaft oscillation signatures. In other embodiments, the detection method is implemented in a digital processor. In some embodiments, the FADEC performs the shutdown of the fuel once a shaft shear event has been detected.

Figure 6:
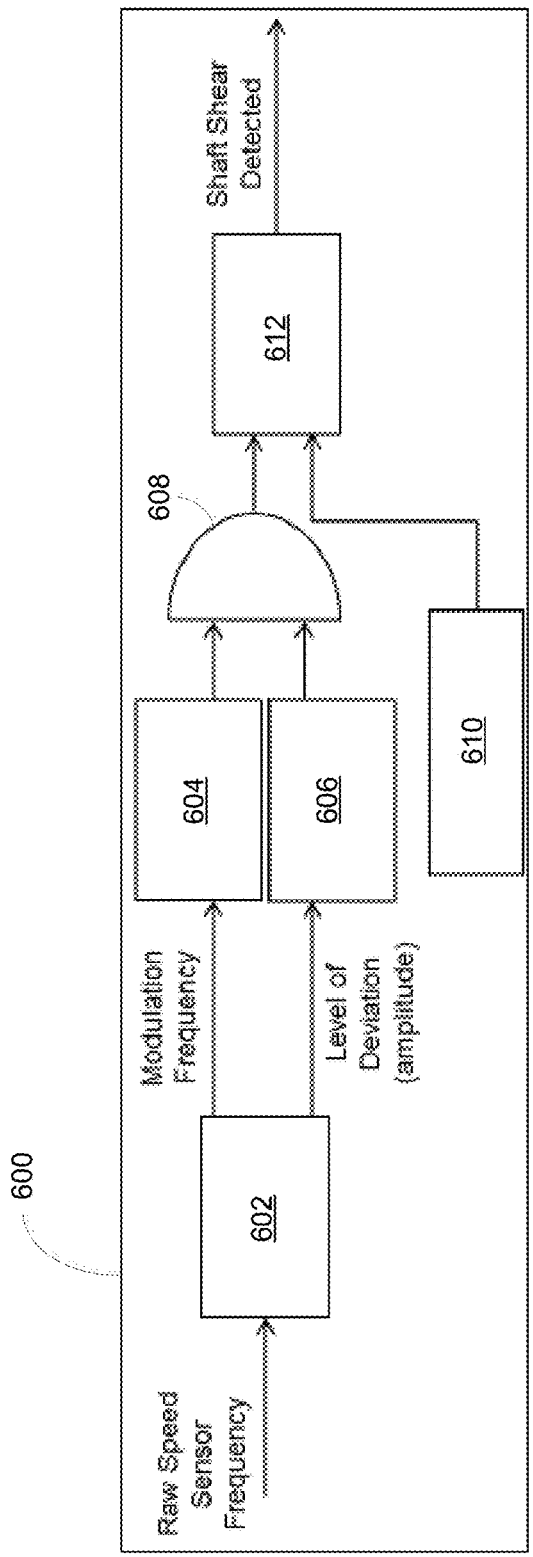
FIG. 6 is a block diagram of an embodiment of the detection method implemented in a hardware circuit.

An example embodiment of an implementation in hardware circuitry is illustrated in FIG. 6. The raw speed sensor frequency may be input to a circuit 600 comprising a frequency demodulator 602, for separating the carrier wave from the modulation wave. The wave modulation frequency and wave modulation amplitude are provided to separate range comparators 604, 606, respectively. If both the wave modulation frequency and the wave modulation amplitude are found to be within the ranges of the signature modulation frequency and the signature modulation amplitude of the shaft oscillation signature, an AND gate 608 will send a signal to a timer or counter 612. When the timer or counter 612 has reached a predetermined time 610 for confirming a shaft shear event, a shaft shear is detected. The shaft shear detection signal may cause an alarm to ring or a warning message to be transmitted/displayed. The shaft shear detection signal may also trigger a fuel shutoff command or may be used as a fuel shutoff command. Different and/or additional components may also be used in the circuit 600 to perform the detection method as described herein.

Figure 7:
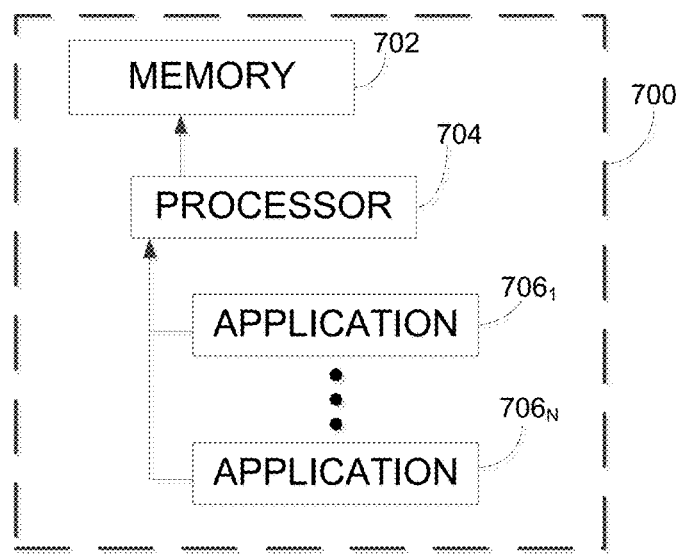
FIG. 7 is a block diagram of an embodiment of the detection method implemented in software and hardware.

An example embodiment of software and hardware implementation is illustrated in FIG. 7. A system 700 for detecting a shaft shear event may comprise, amongst other things, one or more applications $706_1 \ldots 706_n$ running on a processor 704 coupled to a memory 702. Processor 704 may correspond to a plurality of processors. In addition, while the applications $706_1 \ldots 706_n$ are illustrated and described as separate entities, they may be combined or separated in a variety of ways. The memory 702 accessible by the processor 704 may receive and store data. The memory 702 may be a main memory, such as a high speed Random Access Memory (RAM), or an auxiliary storage unit, such as a hard disk, a floppy disk, or a magnetic tape drive, or any combination thereof. The memory 702 may be any other type of memory, such as a Read-Only Memory (ROM), or optical storage media such as a videodisc and a compact disc. The processor 704 may access the memory 702 to retrieve data. The processor 704 may be any device that can perform operations on data. Examples are a central processing unit (CPU), a front-end processor, a microprocessor, and a network processor. The applications $706_1 \ldots 706_n$ are coupled to the processor 704 and configured to perform various tasks.

Figure 8:
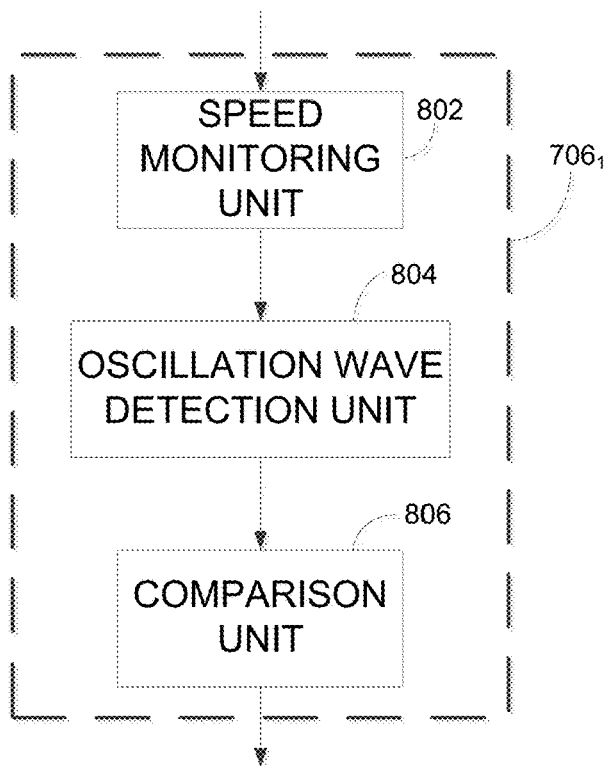
FIG. 8 is a block diagram of an embodiment of an application running on the processor of FIG. 7.

FIG. 8 illustrates an exemplary embodiment of application $706_1$ running on the processor 704. The application $706_1$ illustratively comprises a speed monitoring unit 802, an oscillation wave detection unit 804, and a comparison unit 806. The speed monitoring unit 802 may be configured to monitor the rotational speed by receiving a raw speed signal from a speed sensing device, as described above. The oscillation wave detection unit 804 may be configured to detect an oscillation wave superimposed on the rotational speed of the shaft, as per the embodiments described herein. The comparison unit 806 may be configured to compare the shaft oscillation signature to the oscillation wave, as described herein. Once a match is detected, a shaft shear detection signal and/or a fuel shutoff command may be output.

In some embodiments, the detection method is implemented using a phonic wheel sensing assembly for sensing the rotational speed. The tooth passing time of the phonic wheel may be stored in a buffer. A constant tooth passing time implies a constant speed. When the shaft is sheared, the tooth passing time oscillates with a certain deviation around the tooth passing time immediately before the shear. A processor or circuit monitors each new tooth passing time and compares it with an average of the previous values. If the new passing time sometimes exceeds an upper bound limit and sometimes falls below a lower bound limit, the shaft is determined to be oscillating. A counter is incremented and if the counter exceeds a certain value, shaft shear detection is confirmed.

In some embodiments, the detection method is combined with other detection methods in order to detect a larger spectrum of torque shaft shears. A torque below a minimum threshold may result in a wave modulation amplitude that is indistinguishable from the speed signal. Therefore, a different detection method may be used for torque levels below the minimum threshold. In some embodiments, the detection method may comprise monitoring a torque as applied to the shaft and performing the method only when the torque meets the minimum threshold.

The above description is meant to be exemplary only, and one skilled in the art will recognize that changes may be made to the embodiments described without departing from the scope of the invention disclosed. For example, the detection method may be provided on non-transitory computer readable medium having stored thereon program code executable by a processor for performing the method. The blocks and/or operations in the flowchart described herein are for purposes of example only. There may be many variations to these blocks and/or operations without departing from the teachings of the present disclosure. For instance, the blocks may be performed in a differing order, or blocks may be added, deleted, or modified. Still other modifications which fall within the scope of the present invention will be apparent to those skilled in the art, in light of a review of this disclosure, and such modifications are intended to fall within the appended claims.

The invention claimed is:

1. A method for detecting a shear of a rotating shaft of a gas engine, the shaft positioned between a source and a load, the method comprising:
    storing in memory a shaft oscillation signature determined as a function of known characteristics of the shaft and associated with a shaft shear event, the shaft oscillation signature comprises a signature modulation frequency;
    monitoring a rotational speed of the shaft comprising obtaining a signal from a speed sensing device;
    detecting from the rotational speed an oscillation wave superimposed on the rotational speed, the oscillation wave having a wave modulation frequency and a wave modulation amplitude;
    comparing the shaft oscillation signature to the oscillation wave comprising comparing the signature modulation frequency to the wave modulation frequency;
    detecting the shaft shear event when the oscillation wave corresponds to the shaft oscillation signature; and
    in response to detecting the shaft shear event, commanding a fuel shutoff of the engine.

2. The method of claim 1, wherein the oscillation signature further comprises a signature modulation amplitude, and wherein comparing the oscillation wave to the shaft oscillation signature further comprises comparing the signature modulation amplitude to the wave modulation amplitude.

3. The method of claim 2, wherein the oscillation signature comprises a range of signature modulation frequencies and a range of signature modulation amplitudes, and wherein comparing the oscillation wave to the oscillation signature comprises determining if the wave modulation frequency and the wave modulation amplitude fall within the range of signature modulation frequencies and the range of signature modulation amplitudes, respectively.

4. The method of claim 2, wherein detecting from the rotational speed an oscillation wave comprises decomposing the rotational speed into a carrier wave and a modulation wave, the carrier wave corresponding to the rotational speed and the modulation wave corresponding to the oscillation wave, and extracting the wave modulation frequency and the wave modulation amplitude from the oscillation wave.

5. The method of claim 1, wherein detecting from the rotational speed an oscillation wave comprises detecting a first period below a lower threshold and a second period above an upper threshold, and detecting a rate of occurrence of the first period and the second period.

6. The method of claim 1, wherein the speed sensing device comprises a phonic wheel sensing assembly; and wherein monitoring flail the rotational speed of the shaft comprises determining the rotational speed using flail the phonic wheel sensing assembly.

7. The method of claim 1, further comprising confirming detection of the shaft shear event when the oscillation wave corresponds to the oscillation signature for a predetermined amount of time.

8. The method of claim 1, further comprising monitoring a torque of the shaft and performing the method only when the torque meets a minimum threshold.

9. A system for detecting a shear of a rotating shaft of a gas engine, the shaft positioned between a source and a load, the system comprising:
    a memory storing a shaft oscillation signature determined as a function of known characteristics of the shaft and associated with a shaft shear event, wherein the shaft oscillation signature comprises a signature modulation frequency; and
    at least one of:
    (a) at least one processor configured for executing program code; and
    (b) a circuit;
    the at least one of (a) and (b) configured for:
        monitoring a rotational speed of the shaft comprising obtaining a signal from a speed sensing device;
        detecting from the rotational speed an oscillation wave superimposed on the rotational speed, the oscillation wave having a wave modulation frequency and a wave modulation amplitude;
        comparing the oscillation signature to the oscillation wave comprising comparing the signature modulation frequency to the wave modulation frequency;
        detecting the shaft shear event when the oscillation wave corresponds to the oscillation signature; and
        in response to detecting the shaft shear event, commanding a fuel shutoff of the engine.

10. The system of claim 9, wherein the oscillation signature further comprises a signature modulation amplitude, and wherein comparing the oscillation wave to the oscillation signature further comprises comparing the signature modulation amplitude to the wave modulation amplitude.

11. The system of claim 10, wherein the oscillation signature comprises a range of signature modulation frequencies and a range of signature modulation amplitudes, and wherein comparing the oscillation wave to the oscillation signature comprises determining if the wave modulation frequency and the wave modulation amplitude fall within the range of signature modulation frequencies and the range of signature modulation amplitudes, respectively.

12. The system of claim 10, wherein detecting from the rotational speed an oscillation wave comprises decomposing the rotational speed into a carrier wave and a modulation wave, the carrier wave corresponding to the rotational speed and the modulation wave corresponding to the oscillation wave, and extracting the wave modulation frequency and the wave modulation amplitude from the oscillation wave.

13. The system of claim 9, wherein detecting from the rotational speed an oscillation wave comprises detecting a first period below a lower threshold and a second period above an upper threshold, and detecting a rate of occurrence of the first period and the second period.

14. The system of claim 9, wherein the speed sensing device comprises a phonic wheel sensing assembly for sensing the rotational speed of the shaft.

15. The system of claim 14, wherein the phonic wheel sensing assembly comprises a phonic wheel having phonic teeth, and the phonic teeth are spaced such that a lowest sampled wave modulation frequency is at least five times a highest possible signature modulation frequency.

16. The system of claim 9, wherein the circuit is provided on a dedicated circuit board inside an aircraft electronic engine controller.

17. The system of claim 16, wherein the at least one processor communicates the shaft oscillation signature to the circuit for comparing with the oscillation wave.

18. The system of claim 9, wherein the gas engine is a gas turbine engine; and wherein the source is a turbine and the load is a fan, and the shaft is a lower pressure shaft of the gas turbine engine.

19. A system for detecting a shear of a rotating shaft of a gas engine, the shaft positioned between a source and a load, the system comprising:
  a memory storing a shaft oscillation signature determined as a function of known characteristics of the shaft and associated with a shaft shear event, the shaft oscillation signature comprises a signature modulation frequency;
  a speed sensing device for monitoring a rotational speed of the shaft;
  at least one processor configured for executing program code for:
  detecting from the rotational speed an oscillation wave superimposed on the rotational speed, the oscillation wave having a wave modulation frequency and a wave modulation amplitude;
  comparing the oscillation signature to the oscillation wave comprising comparing the signature modulation frequency to the wave modulation frequency;
  detecting the shaft shear event when the oscillation wave corresponds to the oscillation signature; and
  in response to detecting the shaft shear event, commanding a fuel shutoff of the engine.

* * * * *